Patented May 17, 1949

2,470,083

UNITED STATES PATENT OFFICE 2,470,083

ETHERS OF OXIMINO ACID CHLORIDES

Walter H. Hartung, Baltimore, Md.

No Drawing. Application April 3, 1946,
Serial No. 659,439

4 Claims. (Cl. 260—544)

This invention relates to alpha-alkoximino acids and functional derivatives thereof and to procedure for preparing the same.

It is a primary object of this invention to produce compounds which are useful for the introduction of alpha-amino acid residues into compounds containing hydroxy, primary amino, or secondary amino groups.

One of the particular objects of my invention is the provision of compounds which are valuable intermediates for the synthesis of peptides.

The present invention comprises: preparing an alpha-alkoximino acid having the formula R—C(:N—O—R₁)—CO—OH, where R and R₁ are alkyl or aralkyl radicals, by alkylating an alpha-oximino acid having the formula

R—C(:N—OH)—CO—OH and converting said alpha-alkoximino acid into its functional derivatives, such as the acid halides, acid amides and esters. The alkoximino group in these compounds is converted into an amino group by catalytic hydrogenation.

As the starting materials in my process, there can be employed alpha-oximino acids having the formula R—C(:N—OH)—CO—OH wherein R is, for example, methyl, isopropyl, n-butyl, isobutyl, benzyl, or a benzyl group substituted by methylenedioxy, alkoxyl or any other group convertible to hydroxy. These acids are readily obtained by the method of Hamlin and Hartung (J. Biol. Chem., 145, 349 (1942)).

The alkylation step in my process can be carried out conveniently by employing as the alkylating agent an ester of an alcohol with a strong acid, e. g., methyl bromide, ethyl chloride, methyl sulfate, ethyl sulfate, butyl p-toluenesulfonate, ethyl methanesulfonate, benzyl chloride, etc., in the presence of an alkali, such as sodium hydroxide or potassium hydroxide. In general, I have found that it is advantageous to use about five equivalents of the alkylation ester for each equivalent of alphaoximino acid.

The conversion of the alpha-alkoximino acids into the corresponding alpha-alkoximino acid halides can be carried out by employing reagents generally used for preparing acyl halides from acids, e. g. halides of strong acids, such as phosphorus pentachloride, phosphorus trichloride, phosphorus oxychloride, thionyl chloride, thionyl bromide, etc. Because of the greater ease of isolation of the desired product when thionyl chloride is used, I prefer to use this reagent in practicing my invention. In the preparation of the alpha-alkoximino acid chlorides of lower molecular weight, e. g. the methoximino and ethoximino compounds, I have found that better yields are obtained when the reaction is carried out in the presence of a suitable non-reactive solvent such as anhydrous benzene.

My new alpha-alkoximino acid halides react readily with alcohols and phenols to form esters and with ammonia, primary amines, and secondary amines to form the corresponding amides, as illustrated by the following equations, wherein R₄ is a hydrocarbon radical, and R₂ and R₃ are each selected from the class consisting of hydrogen, hydrogen radicals, and substituted hydrocarbon radicals:

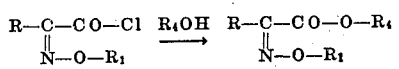

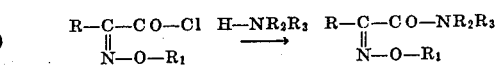

For the hydrogenation of the alpha-alkoximino compounds, I prefer to use a noble metal or nickel catalyst such as palladium, platinum, Raney nickel, etc. The conditions of hydrogen pressure, temperature, solvent, nature of the catalyst, etc. will, of course, markedly affect the rate of the reaction. I have found that, under similar reaction conditions, the benzyloximino group is more rapidly converted to the amino group than is a smaller alkoximino group such as ethoximino. For this reason, if the alkoximino group is ultimately to be converted to an amino group it is advantageous to employ a benzylating agent in the alkylation step of my process.

Because of the susceptibility of the alkoximino group in these compounds to catalytic hydrogenation to yield an amino group, my invention is particularly adapted to the solution of the problems of peptide synthesis. The preparation of synthetic peptides has become an important tool in the study of the physical and chemical properties of proteins and also in the study of proteolytic enzymes. Although there are available a number of procedures for obtaining synthetic peptides, each of these procedures suffers one or more drawbacks such as the use of difficultly available starting materials, the presence of decomposition products in the desired peptide, and lack of certainty as to the manner of linkage or sequence of the component amino acid residues.

The alpha-alkoximino acid halides react with alpha-amino acids to form amides which are converted by catalytic hydrogenation to dipeptides, in accordance with the following equations, wherein R is alkyl or aralkyl and Y is the hydrocarbon or substituted hydrocarbon residue of an alpha-amino acid.

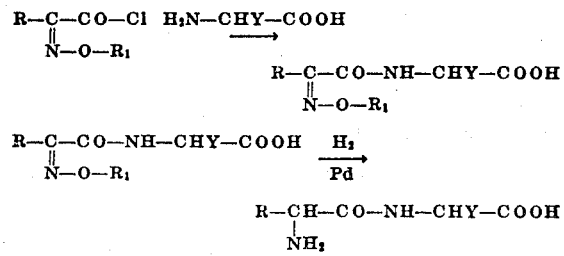

The dipeptides obtained in accordance with my invention have definite known structures and the products are free from decomposition by-products, as contrasted with products of many of the previously known processes.

My invention is illustrated by the following examples without, however, being limited thereto.

*Example 1*

A. 17.9 g. of alpha-oximino-beta-phenylpropionic acid are dissolved in a mixture of 100 ml. of 5% aqueous sodium hydroxide solution and 50 ml. of anhydrous ethyl ether and to this solution is added 80 ml. of petroleum ether. Any precipitate which appears at this point (which consists of a salt of aniline with alpha-ethoximino-beta-phenylpropionic acid) is removed by filtration and the ethereal filtrate is evaporated to dryness. The residue is recrystallized from ethanol-water. The purified product, alpha-ethoximino-beta-phenyl-propionanilide, consists of 5.8 g. of colorless crystals, M. P. 59–60° C. On hydrogenation in the presence of a palladium-on-charcoal catalyst, phenylalanylanilide is formed.

D. 3.0 g. of alpha-ethoximino-beta-phenylpropionyl chloride are added to 10 ml. of anhydrous ethyl alcohol and the mixture is refluxed on a steam bath for thirty minutes. The excess alcohol is then removed by distillation under reduced pressure. The residue is dissolved in ether, and this solution is washed with several small portions of saturated sodium chloride solution. The ethereal solution is dried over anhydrous sodium sulfate and is filtered. The filtrate is distilled at 1/3 mm. pressure and the fraction distilling at 118–120° C., which is ethyl alpha-ethoximino-beta-phenylpropionate, is collected. This ester is a clear, colorless liquid.

*Example 2* tion of the heating period, a current of air is drawn over the mixture and several small portions of water are added to prevent the mixture from solidifying. The mixture is then cooled and is extracted with several portions of ether. The solvent is evaporated from the ethereal solution and the semi-solid residue is washed with a small amount of anhydrous ether. There is thus obtained as a colorless solid 10.3 g. of sodium alpha - benzyloximino - beta - phenylpropionate. Acidification of an aqueous solution of this product and recrystallization of the precipitated solid yields 7.5 g. of crystalline alpha-benzyloximino-beta-phenylpropionic acid, M. P. 79–80° C.

B. A solution of 6.6 g. of thionyl chloride in 15 ml. of anhydrous benzene is added to a solution of 5.0 g. of alpha-benzyloximino-beta-phenylpropionic acid and the mixture is heated under reflux for two hours. To the reaction mixture are then added 100 ml. of anhydrous benzene, the excess thionyl chloride and the benzene are removed by evaporation under reduced pressure, and the resulting residue is distilled. The desired product, alpha-benzyl-oximino-beta-phenylpropionyl chloride, distills at 170–175° C. at 1–2 mm. pressure.

C. To a solution of 1.1 g. of alpha-benzyloximino-beta-phenylpropionyl chloride in 25 ml. of anhydrous ether is added a solution of 0.8 g. of aniline in 10 ml. of anhydrous ether. The mixture is allowed to stand for an hour and the precipitate of aniline hydrochloride which forms is removed by filtration. The ether is removed from the filtrate by evaporation under diminished pressure and the resulting residue is recrystallized from ethanol-water. There is thus obtained 1.2 g. of alpha-benzyloximino-beta-phenylpropionanilide, M. P. 73.5–74.0° C.

Instead of using aniline in part C, above, substituted anilines such as p-chloroaniline or p-anisidine may be used.

*Example 5*

When 7.2 g. of alpha-oximinohexanoic acid are benzylated by the procedure of Example 4, there are obtained 4.8 g. of alpha-benzyloximinohexanoic acid, which is a white, crystalline solid melting at 61.0–61.5° C.

I claim:
1. An alpha-alkoximino acid chloride having the formula

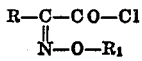

where R and R₁ are members of the group consisting of alkyl and aralkyl.

2. An alpha-alkoximino acid chloride having the formula

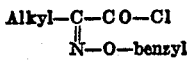

3. An alpha-oximinoether acid chloride having the formula

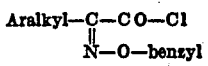

4. Alpha - benzyloximino-beta-phenylpropionyl chloride, having the formula

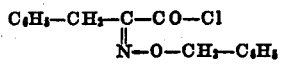

and being characterized by boiling at 170–175° C. (1–2 mm.).

WALTER H. HARTUNG.

REFERENCES CITED

The following references are of record in the file of this patent:

UNITED STATES PATENTS

| Number | Name | Date |
|---|---|---|
| 2,034,850 | Whitmore et al. | Mar. 24, 1936 |
| 2,223,181 | Miller et al. | Nov. 26, 1940 |

OTHER REFERENCES

Conrad et al., "Liebigs Annalen," vol. 209 (1881), p. 215.

Meyer et al., "Berichte deutsche chem. Gesell.," vol. 16 (1888), pp. 609 and 610.

Mueller et al., "Berichte deutsche chem. Gesell.," vol. 16 (1888), p. 2987.

Hantzsch et al., "Liebigs Annalen," vol. 289 (1896), pp. 303 and 304.

Tilden et al., "Jour. Chem. Soc.," (London), vol. 87 (1905), p. 346.

Rendall et al., "Jour. Chem. Soc.," (London), vol. 121 (1922), pp. 2111, 2114 to 2119.

Adkins et al., "Jour. Am. Chem. Soc.," vol. 60 (1938), pp. 1329–1330.

Waters et al., "J. Org. Chem.," vol. 12, May 1947, pp. 469 to 474.

Certificate of Correction

Patent No. 2,470,083.

May 17, 1949.

WALTER H. HARTUNG

It is hereby certified that errors appear in the printed specification of the above numbered patent requiring correction as follows:

Column 2, line 13, for the words "hydrogen radicals" read *hydrocarbon radicals*; column 4, line 23, for "1/3 mm." read *1–3 mm.*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*